(No Model.) 3 Sheets—Sheet 1.
C. F. SHEDD.
APPARATUS FOR TRAINING HORSES TO HARNESS.
No. 317,865. Patented May 12, 1885.
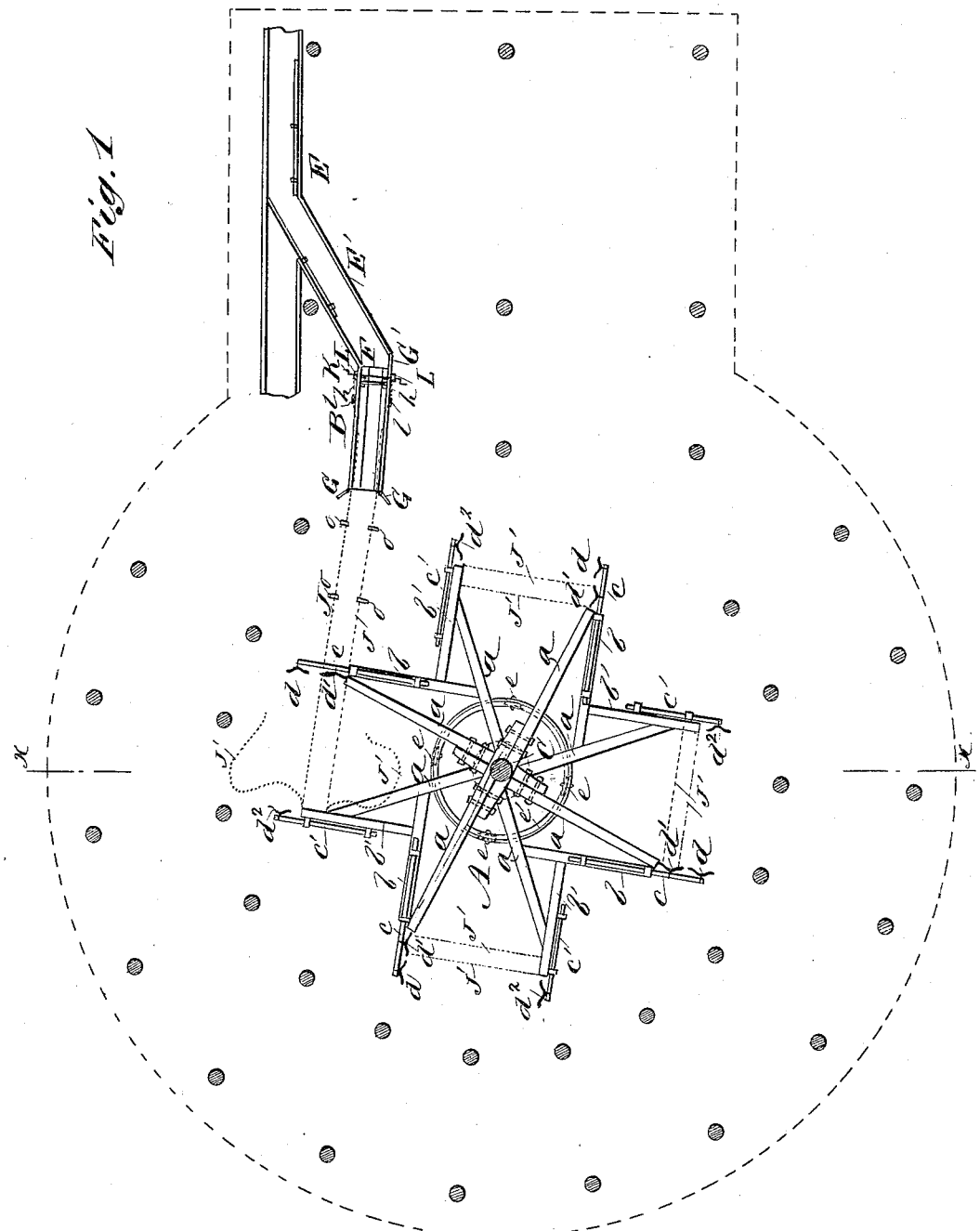
WITNESSES:
C. Neveux
C. Sedgwick
INVENTOR:
C. F. Shedd
BY Munn & Co
ATTORNEYS.

(No Model.) 3 Sheets—Sheet 2.
C. F. SHEDD.
APPARATUS FOR TRAINING HORSES TO HARNESS.
No. 317,865. Patented May 12, 1885.
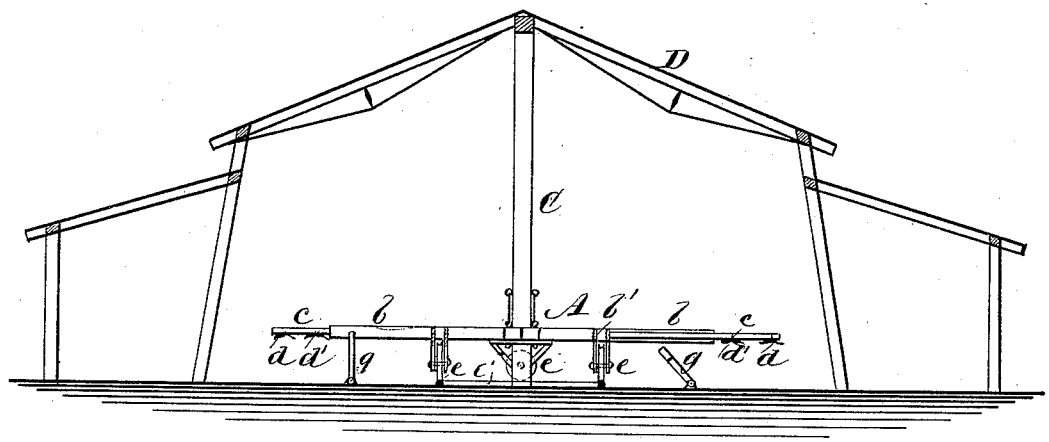
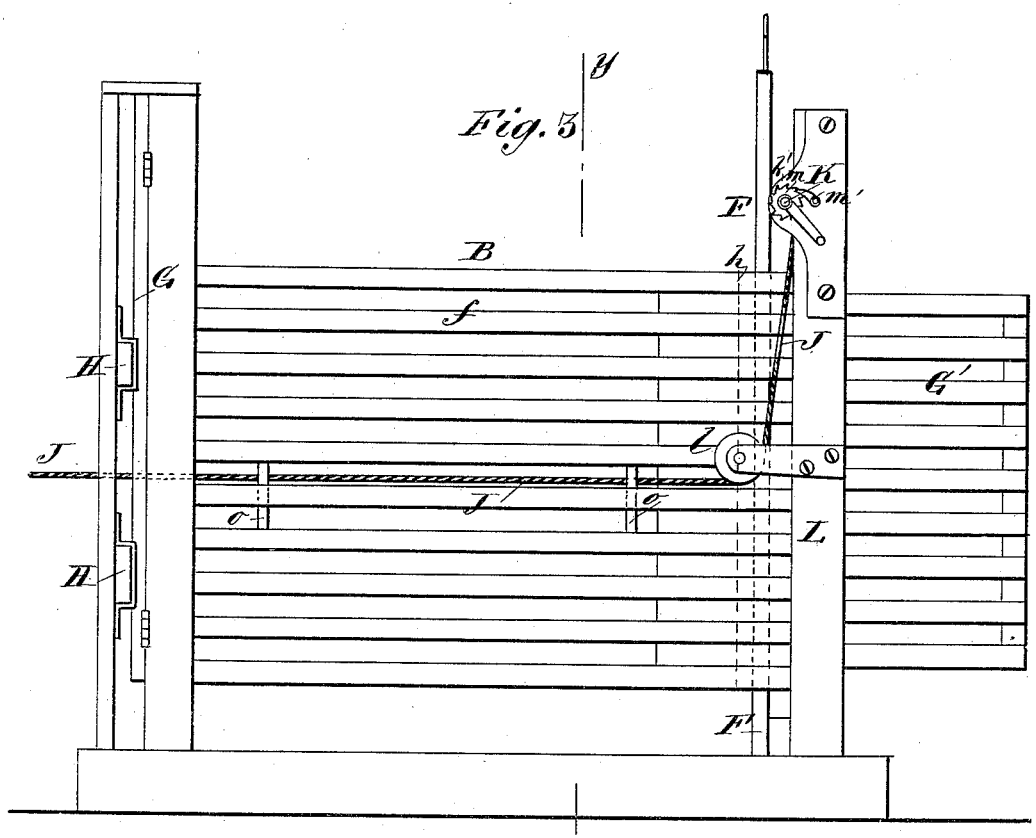
WITNESSES:
INVENTOR:
C. F. Shedd
BY Munn & Co.
ATTORNEYS.

(No Model.) 3 Sheets—Sheet 3.
C. F. SHEDD.
APPARATUS FOR TRAINING HORSES TO HARNESS.
No. 317,865. Patented May 12, 1885.
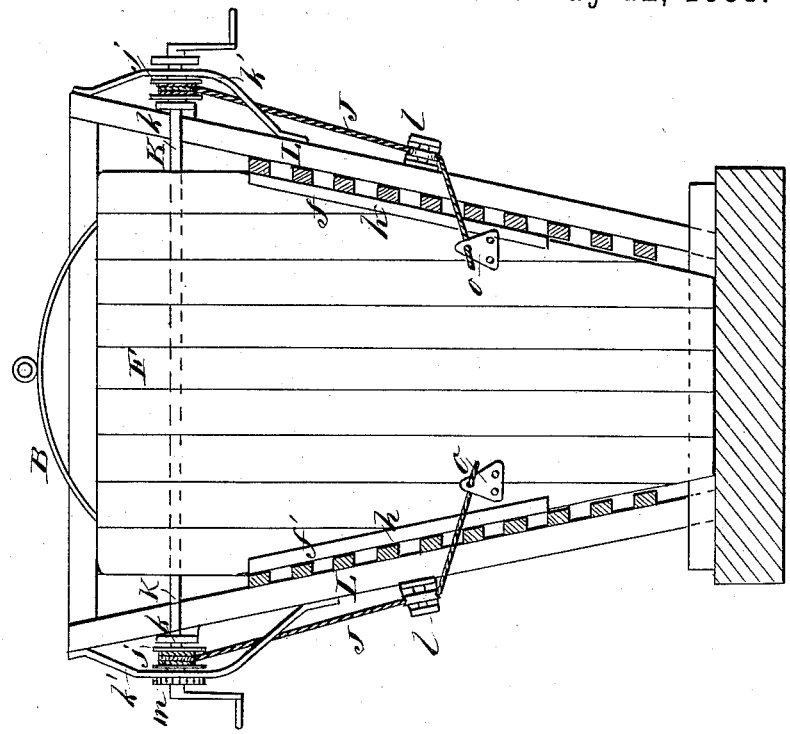
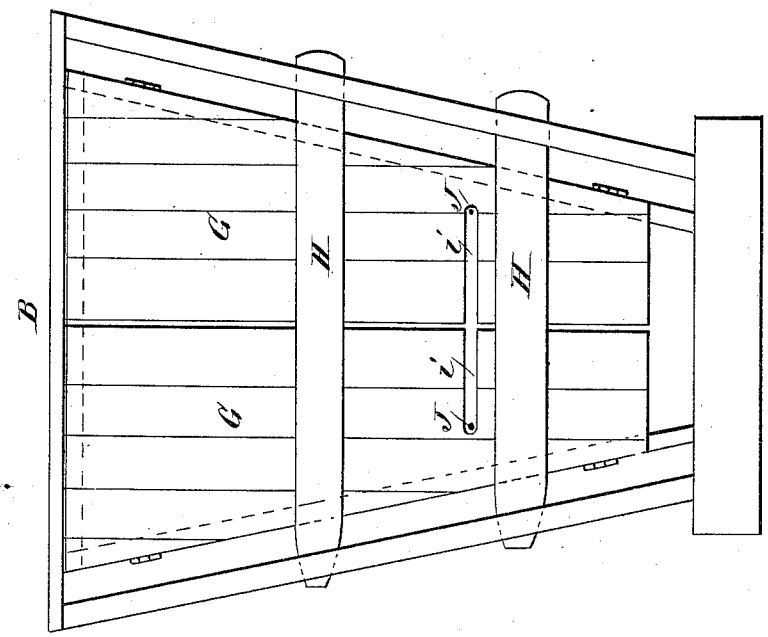
WITNESSES:
C. Neveux
C. Sedgwick
INVENTOR:
C. F. Shedd
BY Munn & Co.
ATTORNEYS.

UNITED STATES PATENT OFFICE.

CHARLES F. SHEDD, OF FAIRFIELD, NEBRASKA.

APPARATUS FOR TRAINING HORSES TO HARNESS.

SPECIFICATION forming part of Letters Patent No. 317,865, dated May 12, 1885.

Application filed July 3, 1884. (No model.)

*To all whom it may concern:*

Be it known that I, CHARLES F. SHEDD, of Fairfield, in the county of Clay and State of Nebraska, have invented a new and Improved Apparatus for Training Horses to the Harness, of which the following is a full, clear, and exact description.

The object of this invention is to provide practical apparatus whereby wild and vicious horses, especially wild western horses, may be harnessed and broken to work without danger to the person or persons handling the horses, and without danger of injury to the horses themselves.

The invention consists, principally, of a harnessing-stall and a suitable sweep, the latter adapted to be connected by a rope or cable, or ropes or cables to the harnessing-stall, by which rope or ropes the horse to be trained may be easily taken from the stall to the arms of the sweep, to which he may be hitched and worked.

The invention also consists of the special construction of the harnessing-stall, and of the special construction of the sweep, and also of the arrangement of the connecting rope or ropes, and the means for hitching the horse to the rope, all as hereinafter fully described and claimed.

Reference is to be had to the accompanying drawings, forming part of this specification, in which similar letters of reference indicate corresponding parts in all the figures.

Figure 1 is a sectional plan view of my invention, the roof of the inclosure being removed. Fig. 2 is a sectional elevation of the same, taken on the line $x\ x$ of Fig. 1, and showing the roof of the inclosure. Fig. 3 is a side elevation of the harnessing-stall. Fig. 4 is a front elevation of the same, the gates being closed and locked; and Fig. 5 is a transverse sectional elevation of the stall, taken on the line $y\ y$ of Fig. 3.

A represents the sweep, and B represents the harnessing-stall. The sweep A revolves around the center post, C, which supports the center of the inclosure D, and the sweep is composed of the radial arms $a\ a$, lapped past the post C and bolted, and of the sweep-arms $b\ b'$, attached to the radial arms $a\ a$, as shown clearly in Fig. 1. The sweep-arms $b$ are each provided with a sliding bar, $c$, which has two whiffletrees, $d\ d'$, attached to them, while the sweep-arms $b'$ each have the bars $c'$ attached to them, to which the neck-yokes $d^2$ are attached.

$e\ e$ are wheels, which run upon the circular track $e'$, for keeping the sweep-arms true and strengthening the sweep, so that it will sustain the weight of a horse should he attempt to throw himself; and $g\ g$ represent hinged braces for locking the sweep, so that it will not revolve while getting the horse from the harnessing-stall B to the sweep and hitching him thereto.

The harnessing-stall B is connected with the chute E, through which the horse is run into the stall B, the space between the inner wall, E', of the chute and the inner slatted wall, $f$, of the stall B being closed by the sliding slats G'. (Shown in Figs. 1 and 3.)

The walls $f\ f'$ of the stall B are made slanting upward and outward, as shown clearly in Figs. 4 and 5, to prevent the horse from turning in the stall, and yet give him a comfortable place to stand, and the rear end of the stall B is closed by the vertically-sliding door or gate F, held in place by the cleats $h\ h$, while the forward end of the stall is closed by the hinged doors G G, which are correspondingly slotted, as shown at $i\ i$, and are adapted to be held closed by the cross-bars H H, shown clearly in Figs. 3 and 4.

J are the ropes, adapted for connecting the stall B with the arms $b'$ of the sweep A. At their rear ends these ropes J are attached to the winding-drums $j$, secured to the crank-shaft K, journaled across the stall in the bearings $k\ k'$, attached in this instance to the rear posts, L L, of the stall, and the ropes J J pass from the winding-drums $j\ j$ first over the side pulleys, $l\ l$, thence through the walls $f\ f'$, and then through the slots $i\ i$, made in the doors G G, and thence to the arms $b'$ of the sweep A, as shown clearly in Fig. 1, where they are secured when a horse is to be harnessed and hitched to the sweep, and upon the crank-shaft K is secured the ratchet-wheel $m$, with which the pawl $m'$ is adapted to engage for preventing the shaft from revolving backward, so that by turning the shaft the ropes J J may be drawn and held taut when they are secured to the sweep-arms b, or entirely wound upon the drum j when the ropes are not in use.

Upon the ropes J are placed two sets of the sliding pieces o o, which in this instance are made of leather, and have three holes made in them, and to which or by which the horse to be handled is strapped or harnessed to the ropes J J by suitable harness gear or straps so arranged that they will support the horse, should he try to throw himself, and also prevent the horse from rearing, plunging, and kicking.

Attached to the arm b' of the sweep A are secured the ropes J' J', which are of suitable length to reach back to the sliding bar c, and of suitable length to be attached thereto, for the purpose next described.

The horse to be broken is first run from the chute E into the stall B, and harnessed and attached to the leading-ropes J J by suitable breast, breeching, and belly straps attached to the sliding pieces o o. This done, the sweep A is then locked by the braces g, so that it cannot revolve. Then the bar c is shoved back, and then the ropes J J are attached to one of the sweep-arms b' and drawn taut by turning the crank-shaft K. The bars H H are then removed, and the gates or doors G G opened, and the horse is run out between the ropes J to the sweep-arm b', the pieces o o sliding along the ropes, the ropes serving to guide the horse, and to prevent the horse from injuring himself or the person or persons handling him. On getting the horse to the sweep-arms b', the free ends of the ropes J' J' will be passed through one of the holes in the sliding pieces o o. Then the bar c will be shoved out and the free ends of the ropes J' will be attached to the bar c. Then the ropes J J will be detached from the sweep-arm b', the ropes J' J' now serving, in connection with the sliding pieces o o and the harness, to prevent the horse from throwing himself or doing any injury. The horse being thus hitched to the sweep, a well-broken horse will be brought alongside of him and attached to the whiffletree d and neck-yoke $d^2$, when the braces g will be disconnected from the sweep and the horses started together, turning the sweep.

The sweep having four sweep-arms, b', is adapted for training four horses at a time, all of which may be attached to the sweep in the manner described.

By this means the horses are handled with great care, and there is no danger to the persons handling the horses, and the horses being hitched alongside of well-broken horses and prevented from rearing, plunging, throwing themselves, and kicking, they become broken very soon, ready for use in the ordinary harness.

The application of the same methods will apply to breaking saddle-horses, by changing the harness slightly and saddling the horse for the rider while attached to the sweep.

I do not claim in this application the special construction and arrangement of the stall, as I have made the same the subject of claims in a separate application, filed July 3, 1884, Serial No. 136,722.

Having thus described my invention, what I claim as new, and desire to secure by Letters Patent, is—

1. The combination, with the harnessing-stall B and sweep A, of the leading-ropes J, attached to the stall and sweep, substantially as and for the purposes set forth.

2. The ropes J, connecting the harnessing-stall and sweep, combined with the sliding pieces o o, to which the horse may be strapped, substantially as and for the purposes set forth.

3. The sweep A, provided with the rope J' J', in combination with the leading-ropes J J and sliding pieces o o, the ropes J J being adapted to be stretched from the sweep to the stall B, substantially as and for the purposes set forth.

4. The sweep A, provided with the horizontal fixed sweep-arms b b', one in front of the other, and the sliding bars c, mounted to slide on said arms, the arm b' being adapted to carry a neck-yoke and the arm b whiffletrees at their outer ends, as described, whereby the animal may be securely held in place when its harness is secured to the whiffletrees and neck-yoke, substantially as set forth.

5. The combination, with the sweep, of the harnessing-stall having end doors, and provided with a windlass, and ropes J, adapted to be connected to the sweep and drawn taut by the windlass, to guide the animal when the gate is opened, substantially as set forth.

6. The combination, with the sweep, of the harnessing-stall having end doors, windlass, pulleys l, and ropes J, passing from said windlass over the pulleys, and adapted to be attached to the sweep, substantially as set forth.

7. The combination, with a sweep and a harnessing-stall adapted to be connected therewith by ropes, as described, of the braces g g, hinged below the sweep, as shown, to engage it with their upper ends and lock it while the animal is being brought from the harnessing-stall.

CHARLES F. SHEDD.

Witnesses:
O. P. ALEXANDER,
C. B. TRACY.